March 6, 1928.
A. E. CARLSON
ROTARY BIT
Filed May 18, 1927   2 Sheets-Sheet 1
1,661,715
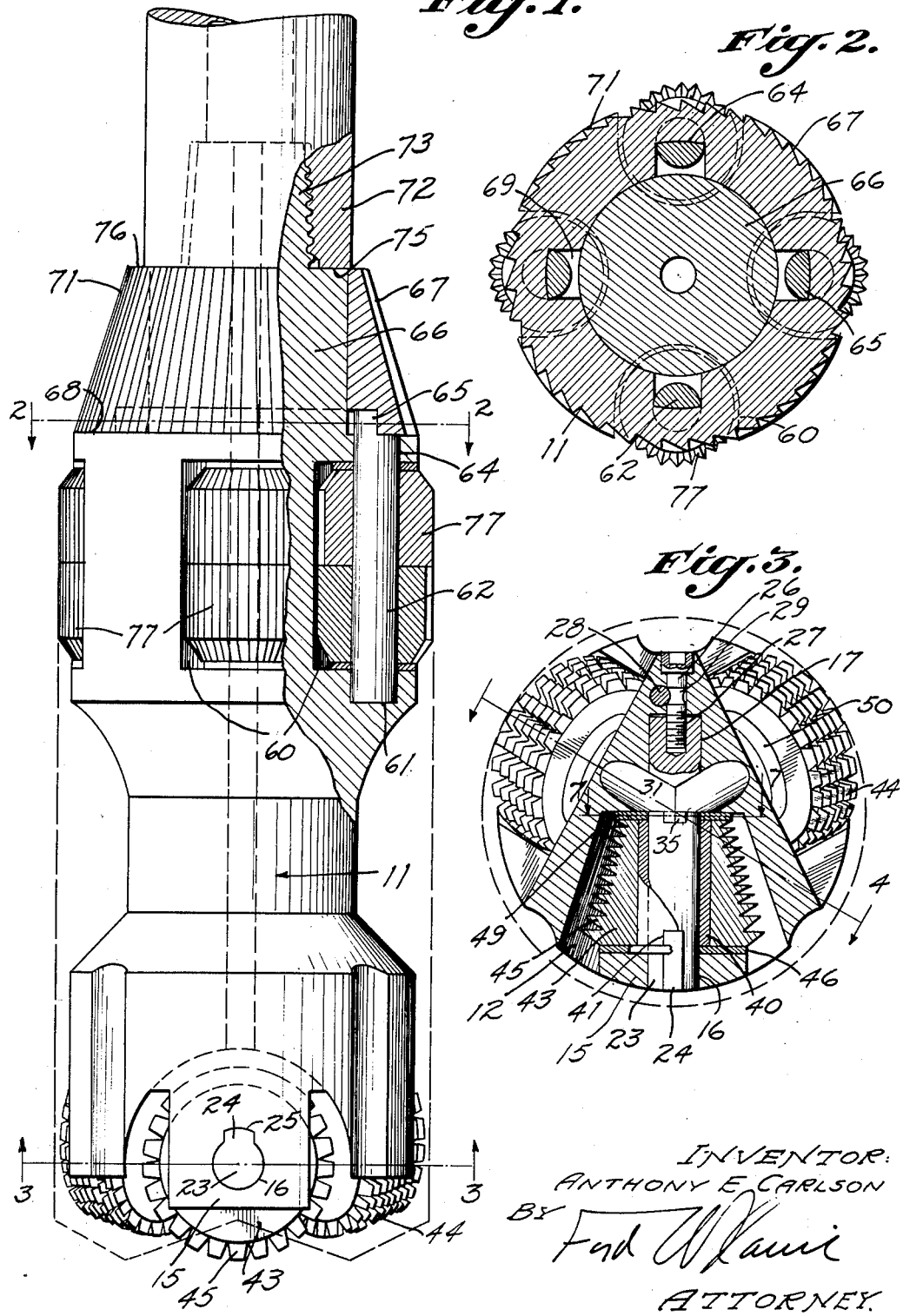
Fig. 1.   Fig. 2.   Fig. 3.
INVENTOR:
ANTHONY E. CARLSON
BY
ATTORNEY.

March 6, 1928.
A. E. CARLSON
ROTARY BIT
Filed May 18, 1927
1,661,715
2 Sheets-Sheet 2
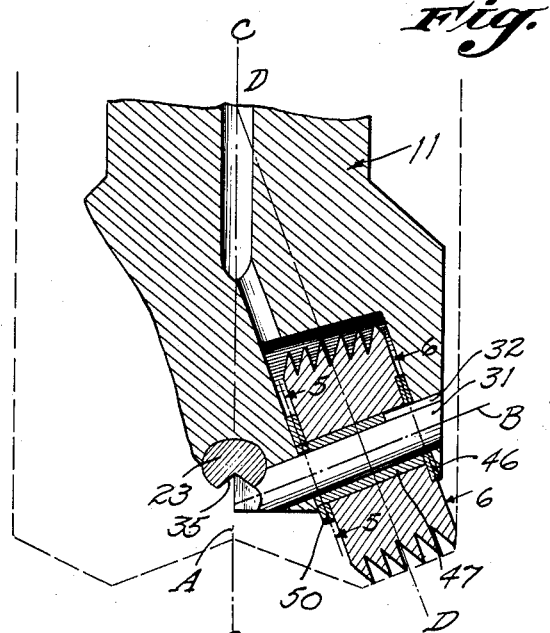
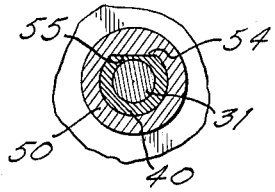
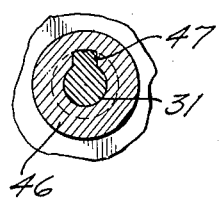
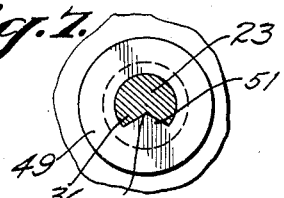
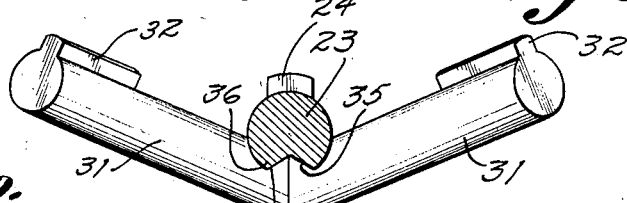
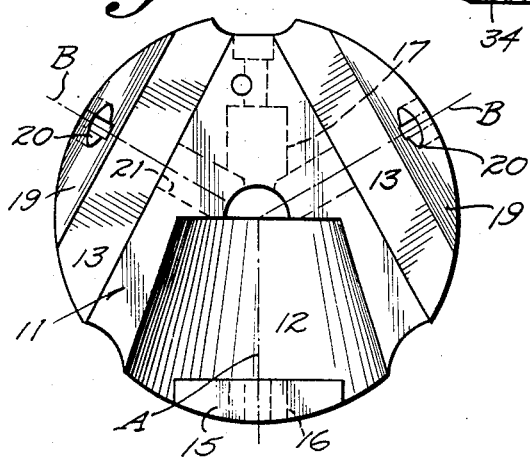
INVENTOR.
ANTHONY E. CARLSON
BY
ATTORNEY.

Patented Mar. 6, 1928.

1,661,715

UNITED STATES PATENT OFFICE.

ANTHONY E. CARLSON, OF LOS ANGELES, CALIFORNIA.

ROTARY BIT.

Application filed May 18, 1927. Serial No. 192,225.

This invention relates to the drilling of oil wells, and relates particularly to a drill bit adapted for use in the rotary system of sinking wells.

In this art the well is drilled by means of a rotary bit attached to the lower end of a drill-pipe, the drill-pipe being rotated by means of a rotary machine in the derrick at the surface of the ground.

It is an object of this invention to provide a bit of simple and rugged construction in which the parts are all locked together.

In my invention I provide a plurality of cutters, preferably three which are mounted on separate shafts, the separate shafts being supported by the body of the bit. One of these shafts is utilized to lock the other two shafts in the body.

It is accordingly an object of this invention to provide a bit in which one of the cutter-carrying shafts locks the other cutter-carrying shafts in place.

Another object of the invention is to provide a bit of the character mentioned in which a novel means is provided for securing the shaft which locks the other shafts in the body of the bit.

The bit of my invention also includes reaming cutters which are supported above the boring cutters at the lower end of the bit. The reaming cutters are supported on shafts which are both retained in place and locked from rotation by a retaining-member, and the retaining-member is in turn locked in place by means of a tool joint which is screwed onto a pin of the body of the bit.

It is one of the objects of this invention to provide a bit in which the shafts supporting the reaming cutters are novelly retained in place and locked from rotation.

A still further object of the invention is to provide cutters which have teeth which are self-sharpening.

Other objects and advantages of the invention will be made evident in the following description.

My invention may be better understood by referring to the accompanying drawings:

Fig. 1 is an elevational view partly in section of the invention.

Fig. 2 is a section taken on the line 2—2 of Fig. 1.

Fig. 3 is a section taken on the line 3—3 of Fig. 1.

Fig. 4 is a section taken on the line 4—4 of Fig. 3.

Fig. 5 is a section taken on the line 5—5 of Fig. 4.

Fig. 6 is a section taken on the line 6—6 of Fig. 4.

Fig. 7 is a section taken on the line 7—7 of Fig. 3.

Fig. 8 is a fragmentary view showing the cutter shafts, per se.

Fig. 9 is a bottom plan view of the body of the bit.

Referring to the drawings for a detailed description of the invention, the body 11 of the bit is provided with a primary cavity 12 and secondary cavities 13 at the lower end thereof as illustrated best in Fig. 9. The primary cavity 12 is arranged centrally on the center line A—A, and the cavities 13 are arranged on center lines B—B. The center lines A—A and B—B are separated by angles of 120 degrees. As shown in Fig. 4 the cavities 13 are formed centrally on center lines D—D in a vertical plane. The center lines D—D diverge in a downward direction from the axis of rotation C—C of the body of the bit. Extending so as to close the outer part of the primary cavity 12 is a primary leg 15 having an opening 16 formed therein concentric with the center line A—A. In alignment with the opening 16 is an opening 17 formed in the body 11 at the inner part of the primary cavity 12. Formed in legs 19 which extend on the outside of the secondary cavities 13 are openings 20 which are concentric with the center lines B—B, and formed in the body at the inside of the cavities 13 are openings 21 which align with the openings 20 and which connect to the opening 17. With reference to Fig. 4 it will be seen that in a vertical plane the center lines B—B extend at right angles to the center line D—D; therefore the openings slant downward toward the center of rotation of the body of the bit.

Extending through the openings 16 and 17 is a primary shaft 23. The primary shaft 23 has a lug 24 formed at the outer end thereof which is adapted to rest in a channel 25 formed in the primary leg 15. This arrangement prevents the primary shaft 23 from rotating. The primary shaft 23 is retained in place by means of a lock-member 26. The lock-member 26 rests in the body 11 concentric with the center line A—A and has a threaded end 27 adapted to screw into a threaded socket provided at the inner end of the primary shaft 23. The lock-member 26 is permitted to rotate in the body but cannot be removed therefrom by reason of a pin 28 which extends in an annular channel 29 of the lock-member. By rotating the lock-member in one direction the primary shaft is pulled against the bottom of the opening 17 and retained securely in place. When the member is rotated in the opposite direction, the primary shaft is moved outward from the body. Resting in the openings 20 and 21 are secondary shafts 31. The secondary shafts 31 have lugs 32 at their outer ends which rest in channels 33 of the legs 19, this arrangement preventing them from rotating. The inner ends of the secondary shafts extend below the inner end of the primary shaft 23. As illustrated best in Fig. 8 the inner ends of the secondary shafts 31 are provided with notches 34. The inner end of the primary shaft 23 is provided with a central groove 35 which extends parallel to the center line A—A which is the axis of the primary shaft 23. The groove 35 provides the primary shaft 23 with keys 36 which rest in the notches 34 of the secondary shafts 31. It will be seen that the notches 34 extend substantially at right angles to the center lines B—B, and consequently when the primary shaft 23 is in place the secondary shafts 31 cannot be removed from the body. In assembling the parts of the bit the secondary shafts 31 are installed in place first and thereafter the primary shaft 23 is installed in place. This installation is possible in view of the fact that the key 36 and the groove 35 are in alignment with the direction of movement of the primary shaft 23 when it is placed and removed.

Supported on the primary and secondary shafts 23 and 31 are bushings 40, these bushings 40 resting in the primary and secondary cavities 12 and 13. The bushings are locked from rotation on the shafts by the inner ends of the lugs 24 and 32 which extend into notches 41 formed in the outer ends of bushings 40. Rotatably carried on the bushings 40 are primary and secondary cutters 43 and 44. There is one primary cutter 43 which rests in the primary cavity 12 and two secondary cutters 44 which rest in the secondary cavities 13. The primary cutter 34 is conical, whereas the secondary cutters 44 are cylindrical. All of these cutters are provided with teeth 45 which are V-shaped as shown. One face of each of the teeth is radial, and the other face of each of the teeth is non-radial as shown, so that the teeth will be self-sharpening as they wear.

Placed between the outer ends of the bushings 40 and inner faces of the primary and secondary legs 15 and 19 are wear-plates 46. The wear-plates, as typically illustrated by the section of Fig. 6, have notches 47 through which the lugs 24 or 32 extend for locking the wear-plates from rotation. Placed between the cutters and the faces which define the inner parts of the cavities are inner wear-plates 49 and 50. The wear-plate 49 is placed in the primary cavity 12 and is provided with a V-shaped projection 51 which is adapted to extend into the groove 35, thus preventing the wear-plate from rotating. The wear-plates 50 are placed in the secondary cavities 13 and surround the inner ends of the bushings in the secondary cavities 13. As illustrated in Fig. 5 the inner ends of the bushings in the secondary cavities have flat faces 54, and the wear-plates have flat faces 55 which engage outer faces 54 and therefore cannot rotate.

The upper part of the body 11 is provided with four cavities 60 which are formed on vertical center lines which extend parallel to the axis of rotation C—C of the body. At the lower ends of the cavity 60 are sockets 61 into which lower ends of shafts 62 extend. The upper ends of the shafts 62 extend through openings 64 provided above the cavities 60 to the exterior of the body 11. The upper projecting ends of the shafts 62 are cut away so that they are semi-cylindrical as indicated at 65. It is not necessary that these ends 65 be semi-cylindrical but be any form which is non-cylindrical. The portion 66 of the body 11 above the portion which has the cavity 60 is cylindrical as shown. Adapted to be placed on the portion 66 is a retaining-member or cutting-member 67. The lower face of the retaining-member 67 is adapted to engage an upper radial face 68 formed where the portion 66 of the body 11 connects to the remaining portion of it. The retaining-member 67 is provided with recesses 69 into which the ends 65 of the shaft 62 extend. As illustrated best in Fig. 2 the recesses 69 are so shaped that the portions 65 are engaged and the shafts 62 cannot rotate. It will also be seen that the retaining-member is restrained from rotation by the portion 65. The outer face of the retaining-member 67 is conical and is provided with teeth 71. The retaining-member is slid into the position shown in the drawings and is locked in place by a tool joint 72 which forms a part of the string of drill pipe to which the bit is connected. The tool joint 72 is secured to the body of the bit 11 by means of a pin 73 of the body which screws into a cavity of the tool joint. A lower face 75 of the tool joint engages an upper face 76 of the retaining-member and locks it in place.

Supported by the shafts 62 in the cavities 60 are split reaming elements or cutters 77. The reaming cutters 77 project slightly from the cavities 60 so that they may ream the sides of the hole dug by the boring cutters at the lower part of the bit.

From the foregoing description it should be apparent that the invention is designed for sturdiness which is so essential in the oil-producing industry. The design of the lower end of the bit which permits the secondary shafts to be locked in place by the primary shaft is important to the invention. It is very important to the invention to have the locking-means entirely inside the body where it cannot possibly be damaged or worn away so that any parts will be lost. The lock-member 26 for drawing the primary shaft 23 into the openings 16 and 17 is a very valuable part of the invention.

It will be seen that the primary and secondary cutters 43 and 44 cover the entire area at the bottom of a hole being dug. The primary cutter 43 is placed entirely within the limits of the body 11 and takes away the material at the central part of the hole. The secondary cutters 44 are adapted to cut away the outer parts of the hole, these secondary cutters 44 projecting outward from the outer diameter of the body 11 as illustrated in Fig. 3.

The reaming arrangement included in the upper part of the body 11 is also an important part of the invention. It will be noted that the retaining-member 67 is a cutting-member serving two purposes; first, to hold the shafts 62 in the body 11 and to prevent them from rotating, and also to cut a path for the bit when there has been a cave-in above the bit and it is necessary to withdraw it from the well. The tool joint 72 also serves two purposes; first, as a means for securing the bit to the drill pipe, and second, as a means for securing the retaining-member 67 in place. The retaining-member 67, as previously pointed out, is prevented from rotating by the portion 65 resting in the recesses 69.

It, of course, is obvious that various modifications may be made without departing from the spirit and scope of the invention.

I claim as my invention:

1. A bit for drilling wells, comprising: a body; a shaft carried by said body; a cutter carried by said shaft; and a rotatable lock-pin carried by said body, said lock-pin being adapted for threaded engagement with said shaft and being adapted to pull said shaft into said body when said lock-pin is rotated in one direction and to push said shaft out of said body when said lock-pin is rotated in the reverse direction.

2. A combination as defined in claim 1 in which said lock-pin cannot be removed from said body during operation.

3. A bit for drilling wells, comprising: a body; a primary shaft carried by said body, said shaft having a key; a secondary shaft carried by said body, said secondary shaft having a notch into which said key extends for locking said secondary shaft to said body; cutters carried by said shafts; and means for locking said primary shaft to said body.

4. A combination as defined in claim 3 in which said key is parallel to the axis of said primary shaft.

5. A combination as defined in claim 3 also including means for preventing said primary and secondary shafts from rotation.

6. A combination as defined in claim 3 in which said means for locking said primary shaft to said body includes a rotatable lock-pin carried by said body, said rotatable lock-pin being adapted to threadedly engage said shaft and being adapted to pull said shaft into said body.

7. A bit for drilling wells, comprising: a body; a primary shaft carried by said body, said primary shaft having a plurality of keys; a plurality of secondary shafts carried by said body, said secondary shafts each having a notch into which one of said keys extends for locking each of said secondary shafts to said body; cutters carried by said shafts; and means for locking said primary shaft to said body.

8. A combination as defined in claim 7 in which said body is provided with cavities and in which said cutters rest.

9. A bit for drilling wells, comprising: a body; a primary shaft carried by said body; a secondary shaft carried by said body; a key carried by one of said shafts adapted to engage in a notch of the other of said shafts for locking said secondary shaft to said body; cutters carried by said shafts; and means for locking said primary shaft to said body.

10. A bit for drilling wells, comprising: a body; a primary shaft carried by said body; a secondary shaft carried by said body; a key carried by one of said shafts adapted to engage in a notch of the other of said shafts for locking said secondary shaft to said body; cutters carried by said shafts; means for locking said primary shaft to said body; primary means for preventing said primary shaft from rotating relative to said body; and secondary means for preventing said secondary shaft from rotating relative to said body.

11. A bit for drilling wells, comprising: a body; a primary shaft carried by said body; a secondary shaft carried by said body; a key carried by one of said shafts adapted to engage in a notch of the other of said shafts for locking said secondary shaft to said body; cutters carried by said shafts; means for locking said primary shaft to said body; restraining means for restraining one of said shafts from rotation relative to said body; and a wear bushing carried by the last-named shaft, said bushing being restrained from rotation relative to said body by said restraining means.

In testimony whereof, I have hereunto set my hand at Los Angeles, California, this 12th day of May, 1927.

ANTHONY E. CARLSON.